US008693172B2

(12) United States Patent
Russell et al.

(10) Patent No.: US 8,693,172 B2
(45) Date of Patent: Apr. 8, 2014

(54) FLAT PANEL DISPLAY MOUNT

(75) Inventors: Scott Russell, Woodbury, MN (US); Nick Stanek, Roseville, MN (US); Joel W. Pfister, Golden Valley, MN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 229 days.

(21) Appl. No.: 12/811,687

(22) PCT Filed: Jan. 5, 2009

(86) PCT No.: PCT/US2009/030132
§ 371 (c)(1),
(2), (4) Date: Sep. 24, 2010

(87) PCT Pub. No.: WO2009/089169
PCT Pub. Date: Jul. 16, 2009

(65) Prior Publication Data
US 2011/0019344 A1  Jan. 27, 2011

Related U.S. Application Data

(60) Provisional application No. 61/019,112, filed on Jan. 4, 2008.

(51) Int. Cl.
*H05K 7/14* (2006.01)
*G06F 1/16* (2006.01)

(52) U.S. Cl.
CPC ........... *G06F 1/1637* (2013.01); *Y10S 248/921* (2013.01); *Y10S 248/923* (2013.01); *Y10S 248/924* (2013.01)
USPC ............ 361/679.01; 361/679.22; 361/679.02; 248/921; 248/923; 248/924

(58) Field of Classification Search
CPC ....... F16M 13/02; F16M 11/08; F16M 11/04; F16M 11/041; F16M 11/18; F16M 11/22; F16M 11/24; F16M 11/28; F16M 13/00; F16M 13/022; F16M 2200/048; F16M 11/00; F16M 11/048; F16M 11/06; F16M 11/12; F16M 11/14; F16M 11/2092; F16M 11/26; F16M 11/42; F16M 2200/024; F16M 2200/028; F16M 2200/041; F16M 2200/044; F16M 2200/061; F16M 2200/063; H04N 5/655; H04N 2201/0089; H05K 13/04; H05K 7/183; H05K 2201/10128; H05K 2201/10446; H05K 7/00; H05K 9/0054; H05K 5/02; H05K 7/18; G06F 1/16; G06F 1/1601; G06F 3/147; G06F 1/1637; G09F 13/04; G09F 19/22
USPC ............ 361/679.02, 679.01, 679.09, 679.21, 361/679.26, 679.27, 681, 682, 679.22; 248/917–924
See application file for complete search history.

(56) References Cited

U.S. PATENT DOCUMENTS

| | | | |
|---|---|---|---|
| 6,315,258 B1 | 11/2001 | Myler et al. | |
| 6,554,238 B1* | 4/2003 | Hibberd | 248/278.1 |
| 7,438,269 B2 | 10/2008 | Pfister et al. | |
| 7,448,584 B2* | 11/2008 | Chen et al. | 248/278.1 |
| 7,487,943 B1* | 2/2009 | Gillespie | 248/282.1 |
| 7,510,156 B1* | 3/2009 | Yaeger | 248/284.1 |
| 7,663,868 B1* | 2/2010 | Lam | 361/679.06 |
| 7,753,332 B2 | 7/2010 | O'Keene | |
| 8,094,438 B2 | 1/2012 | Dittmer et al. | |
| 2002/0033436 A1 | 3/2002 | Peng et al. | |
| 2002/0179801 A1 | 12/2002 | Kim | |
| 2007/0095992 A1* | 5/2007 | Dozier | 248/276.1 |
| 2007/0120032 A1 | 5/2007 | Anderson et al. | |
| 2008/0078906 A1 | 4/2008 | Hung | |

FOREIGN PATENT DOCUMENTS

| | | |
|---|---|---|
| CN | 2816558 Y | 9/2006 |
| CN | 1892919 A | 1/2007 |
| CN | 1929036 A | 3/2007 |
| EP | 1742469 A2 | 1/2007 |
| EP | 1742469 A2 | 1/2007 |
| KR | 2002-0092698 | 12/2002 |
| KR | 2002-0092699 | 12/2002 |
| KR | 10-2004-0083737 | 10/2004 |
| TW | 308357 U | 4/2008 |

OTHER PUBLICATIONS

Supplementary European Search Report Dated Jun. 6, 2011, related to EP App. No. 09701032, 2 Pgs.
Chinese Office Action Containing Search Report, Dated Oct. 8, 2012, 8 Pgs.
Second Chinese Office Action Dated Jul. 29, 2013, 17 Pgs., cited in Chinese Application No. 200980104990.0.

\* cited by examiner

*Primary Examiner* — Anthony Haughton
*Assistant Examiner* — Ingrid Wright
(74) *Attorney, Agent, or Firm* — Patterson Thuente Pedersen, P.A.

(57) ABSTRACT

A mounting system for a flat panel display includes a back assembly, a pair of arm assemblies, and a mounting assembly. Back assembly can include a slide plate connected to arm assemblies allowing arm assemblies and mount assembly to be horizontally shifted without the need to remove the mount from the wall and reattach it. Arm assemblies can include substantially hollow arms having removable covers for storing wires connected to display therein. Mounting assembly can include a tilt head that provides a path of rotation about a substantially horizontal axis that extends proximate the center of gravity of the mount and a flat panel display mounted thereon, allowing for easy adjustment and rotation of display, Mounting assembly can also include a pair of brace arms each comprised of two members configured to allow mount assembly to be expanded to mount various sized displays without extending beyond the width of the display.

9 Claims, 17 Drawing Sheets

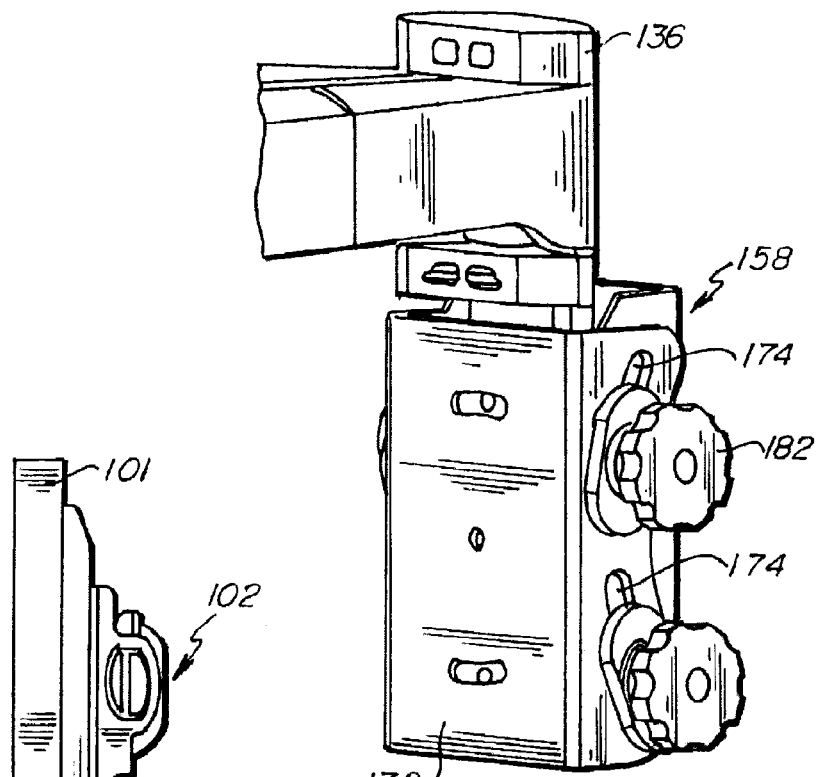
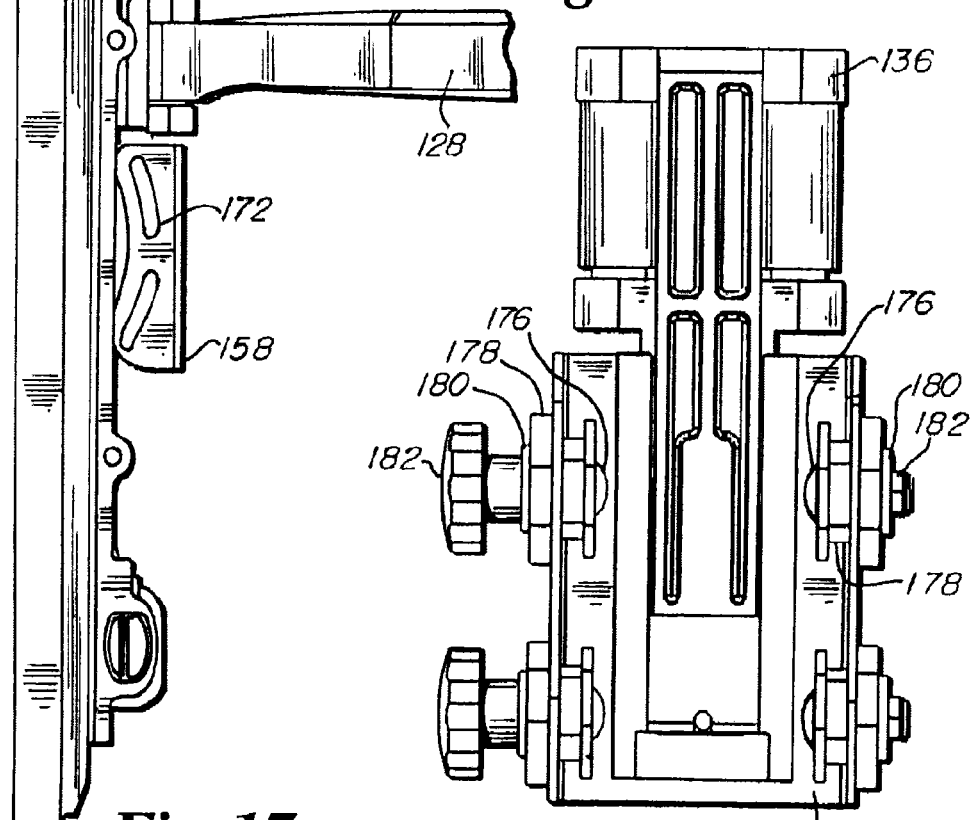
Fig.15.
Fig.16.
Fig.17.

FLAT PANEL DISPLAY MOUNT

RELATED APPLICATIONS

The present Application claims the benefit of U.S. Provisional Application No. 61/019,112, filed Jan. 4, 2008, which is hereby fully incorporated herein by reference.

FIELD OF THE INVENTION

The present invention relates to flat panel display mounting systems, and more particularly to selectively adjustable flat panel display mounting systems.

BACKGROUND OF THE INVENTION

Flat panel displays have become an increasingly popular substitute for projection devices and CRT's. The flat panel display is typically mounted on a structure, such as a wall. Flat panel displays, especially LCD displays, are typically most clearly viewable from a position directly in front of the display. The display image is often too dark or not visible at all if viewed from a significant angle.

It is thus preferable that the angle of a flat panel display can be adjusted for optimum viewing. Various prior art positioning devices have been used, such as friction based hinges, mechanical linkages with springs or other biasing devices, and various mechanical latches. The friction based devices need to be sufficiently strong to hold a relatively heavy flat panel displays, while being easy to operate. Traditional friction based devices and mechanical latches often require one person to hold the flat panel display at the correct angle, while a second person adjusts the device. Movement in the upward direction requires the operator to lift a substantial portion of the weight of the flat panel display. In some instances, the operator must also overcome the resistance of the positioning device.

In order to properly support a flat panel display, a mounting device must also be firmly attached to the wall to which it is mounted. This requires fasteners that make holes in the wall. Thus, to create even a minor horizontal shift of the wall mount and display relative to the wall, an entire new set of holes must be made in the wall.

The width of the portion of flat panel display mounting devices to which the flat panel display is mounted is often adjustable. This is necessary due to the varying sizes of flat panel displays and, accordingly, the varying locations of mounting apertures for mounting the displays. However, when mounting brackets of a mounting device that is capable of mounting a wider display are brought closer together for mounting a narrower display, the brace arms upon which the mounting brackets slide can stick out beyond the width of the display, lowering the aesthetic appeal of a costly device bought chiefly for its aesthetics.

A number of wires generally need to be run from the flat panel display to one or more devices, such as a cable or satellite television receiver or a DVD player, as well as to an electrical outlet for powering the display. These wires tend to hang out in the open, which also tends to distract from the aesthetics of the flat panel display. The wires also have a tendency to become tangled, which makes it more difficult to remove or adjust the flat panel display and/or other devices.

SUMMARY OF THE INVENTION

A mounting system for a flat panel display includes a back assembly, a pair of arm assemblies, and a mounting assembly. Back assembly can include a slide plate connected to arm assemblies which allows arm assemblies and mount assembly to be horizontally shifted without the need to remove the mount from the wall and reattach it. Arm assemblies can include substantially hollow arms having removable covers for storing wires connected to display therein. Mounting assembly can include a tilt head that provides a path of rotation about a substantially horizontal axis that extends proximate the center of gravity of the mount and a flat panel display mounted thereon, allowing for easy adjustment and rotation of display. Mounting assembly can also include a pair of brace arms each comprised of two members configured to allow mount assembly to be expanded to mount various sized displays without extending beyond the width of the display.

BRIEF DESCRIPTION OF THE DRAWINGS

FIG. 15 is a perspective view of a portion of the flat panel display mount of FIG. 1;

FIG. 16 is a perspective view of a portion of the flat panel display mount of FIG. 1;

FIG. 17 is a perspective view of a portion of the flat panel display mount of FIG. 1 and a flat panel display;

DETAILED DESCRIPTION OF THE PREFERRED EMBODIMENTS

Figure 1:
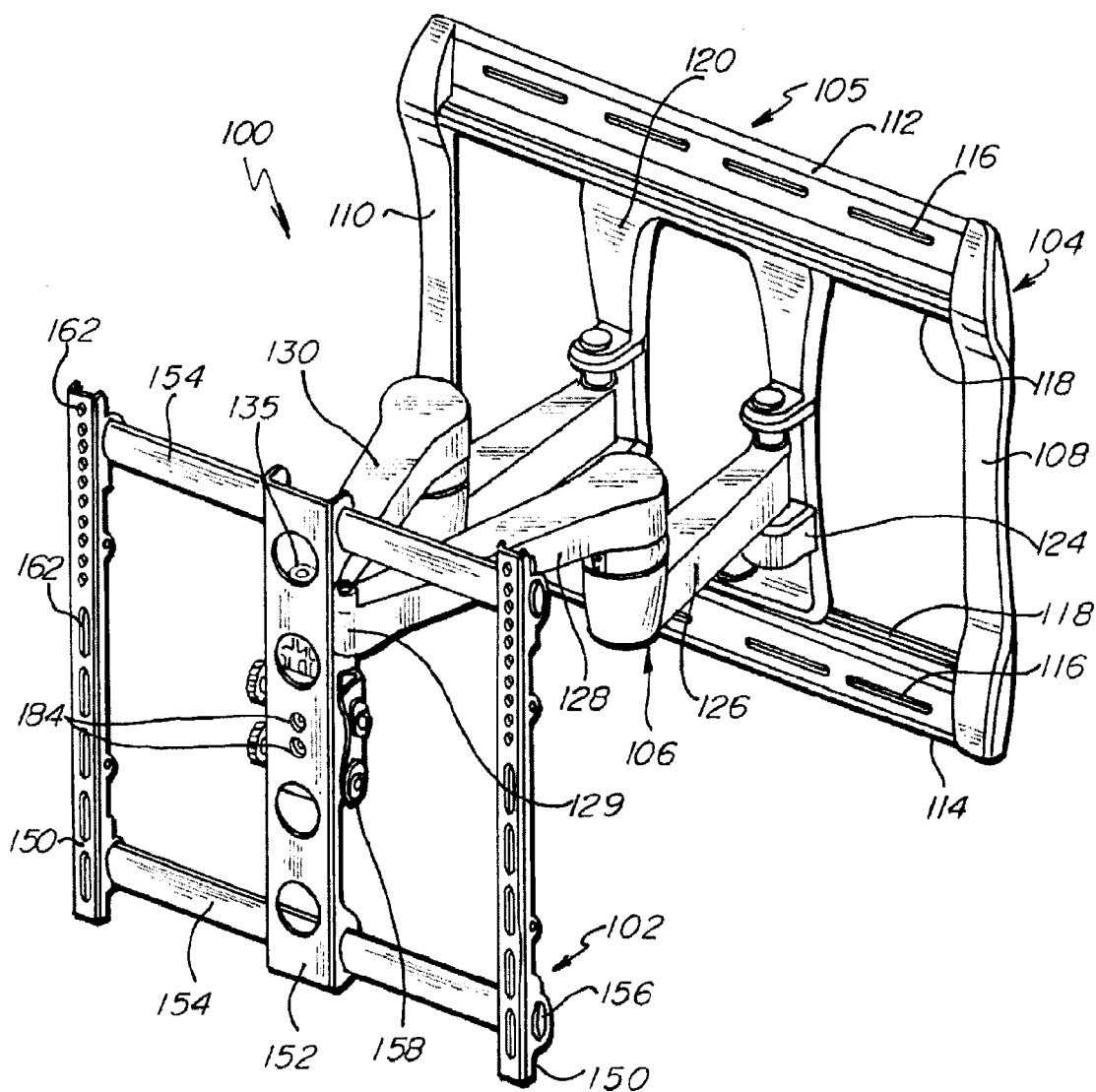
FIG. 1 is a front perspective view of a flat panel display mount according to an embodiment of the present invention.
Figure 2:
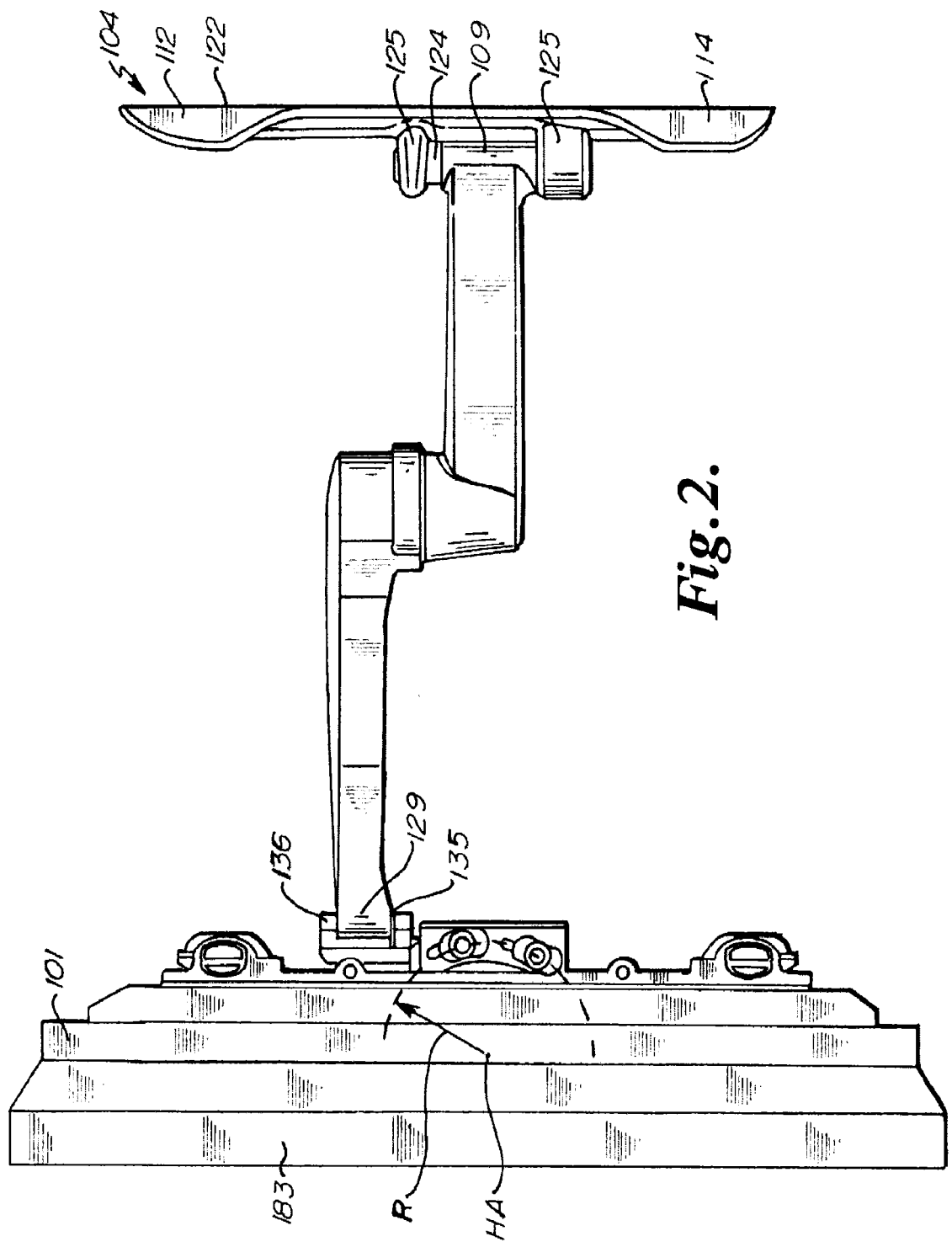
FIG. 2 is a side view of the flat panel display mount of FIG. 1 and a flat panel display.
Figure 3:
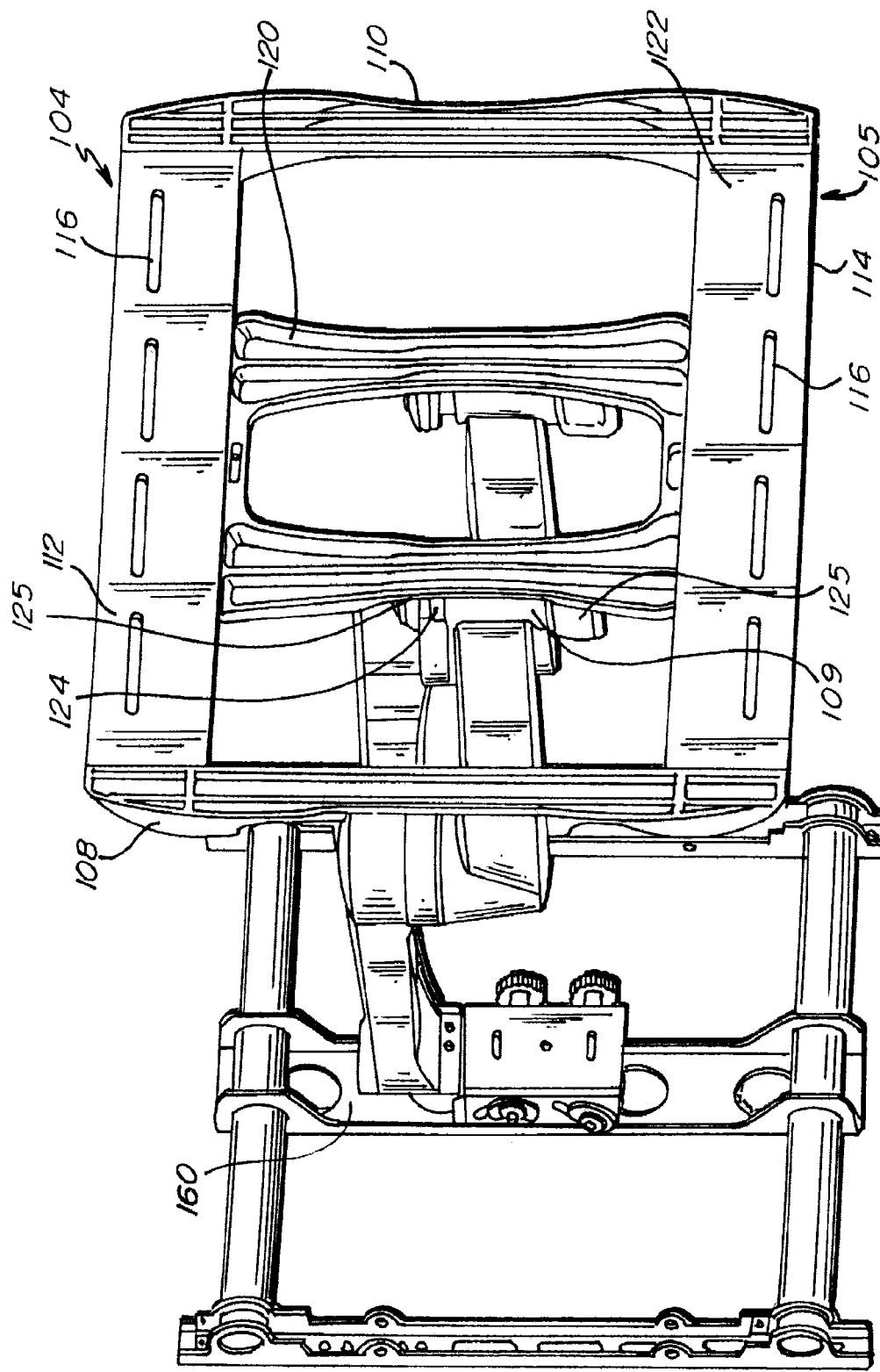
FIG. 3 is a rear perspective view of the flat panel display mount of FIG. 1.
Figure 4:
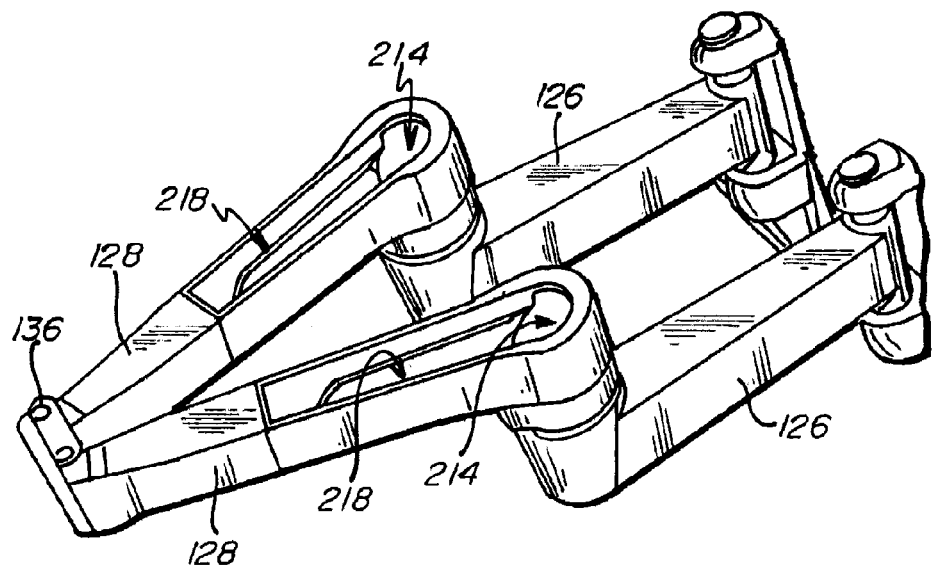
FIG. 4 is a perspective view of a portion of the flat panel display mount of FIG. 1.
Figure 5:
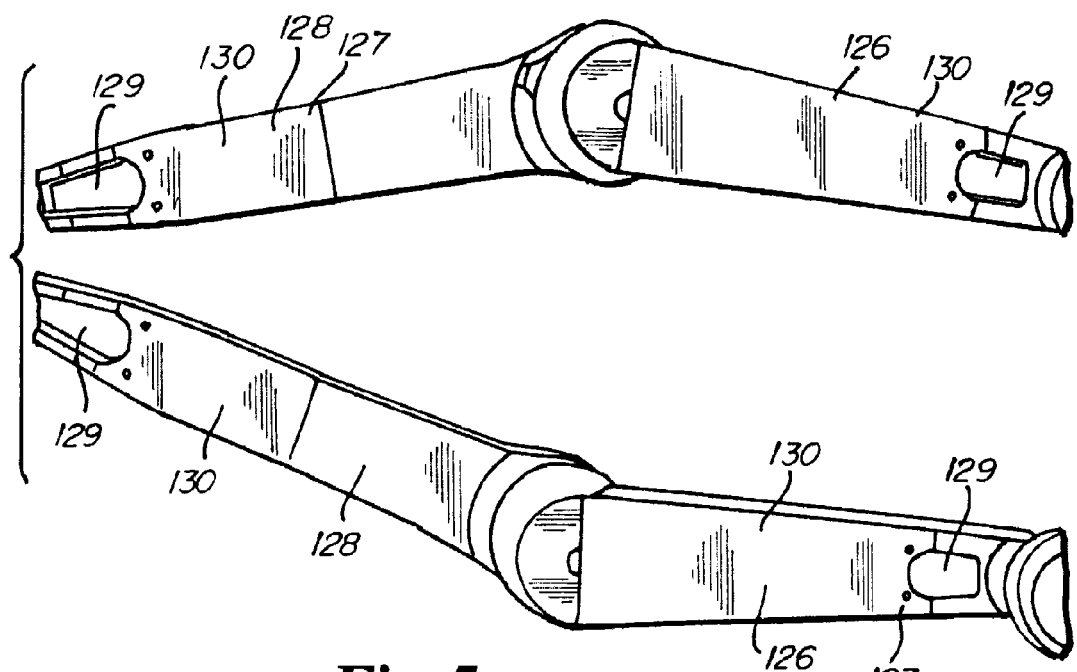
FIG. 5 is a perspective view of a portion of the flat panel display mount of FIG. 1.
Figure 6:
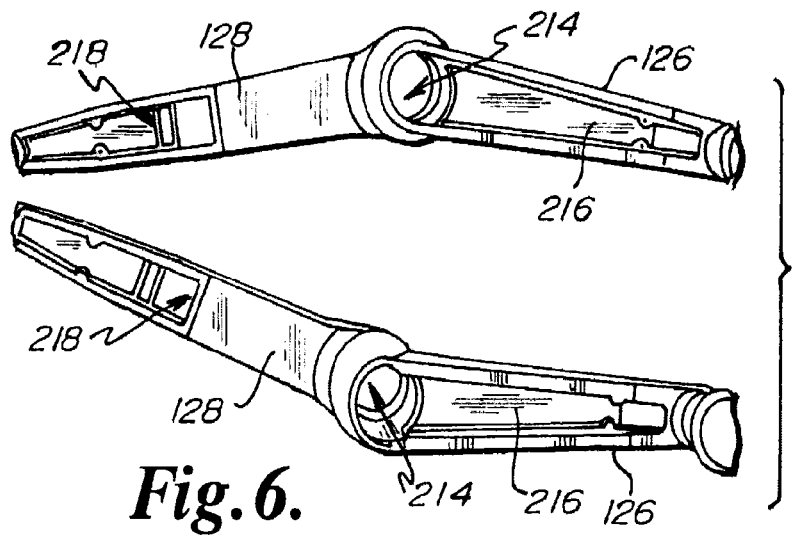
FIG. 6 is a perspective view of a portion of the flat panel display mount of FIG. 1.
Figure 7:
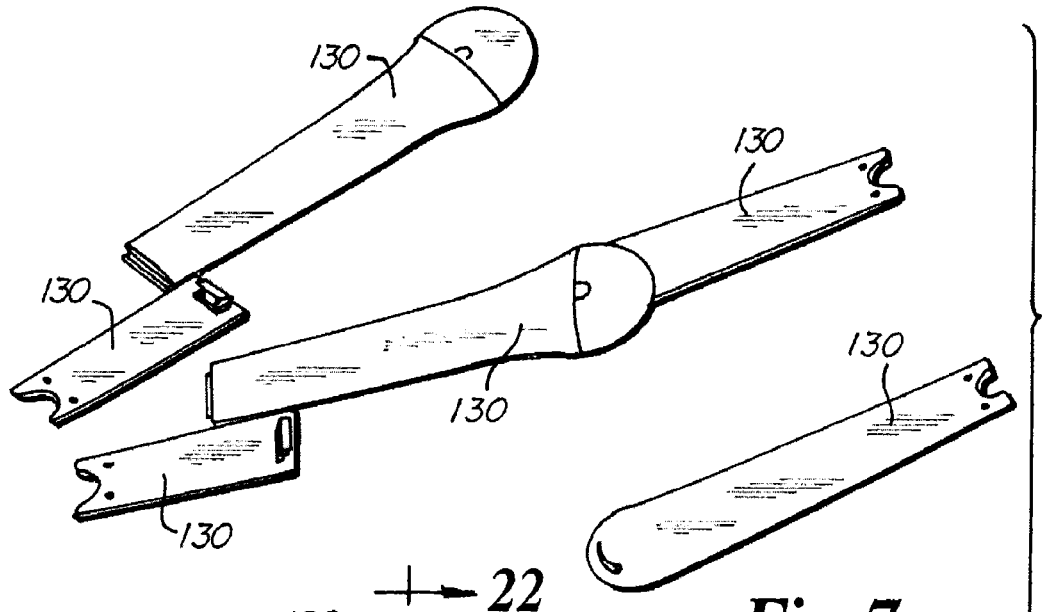
FIG. 7 is a perspective view of a portion of the flat panel display mount of FIG. 1.

FIGS. 1-17 show a first embodiment of a display mount 100 of the present invention. Display mount 100 is configured to mount an interface such as a flat panel display, such as a computer monitor or television. Referring to FIGS. 1-3, display mount 100 generally includes a mounting assembly 102 and a back assembly 104 connected by a pair of arm assemblies 106.

Back assembly 104 can include a generally rectangular support 105. Support 105 can include a pair of side rails 108, 110, a top rail 112 and a bottom rail 114. Side rails 108, 110, top rail 112, and bottom rail 114 define a back surface 122 that can be mounted flush with a wall or other support surface.

Top rail 112 and bottom rail 114 can include a plurality of elongated mounting slots 116. Mounting slots 116 are configured to allow back assembly 104 to be mounted to a wall or other support surface. The elongated nature of mounting slots 116 provides for flexibility in positioning display mount 100 relative to the studs in a wall. This is advantageous because display mounts 100 for larger flat panel displays often must be attached to the studs to properly support the displays so that the display 101, mount 100, and wall aren't damaged. Often, mounts having spaced apart screw-hole type mounting apertures cannot be mounted to studs because the spacing of the mounting apertures does not conform to the spacing between studs. The elongated mounting slots 116 of the present invention overcome this disadvantage.

Top rail 112 and bottom rail 114 can each include a track 118 extending along an interior surface thereof. A slide plate 120 can be slidably disposed within tracks 118. Slide plate 120 provides for flexibility in horizontal positioning of display relative to the mounting surface by allowing horizontal shifting of arm assemblies 106 and mounting assembly 102 without having to remove and reattach back assembly 104. This allows for a greater range of positioning options for display without creating more mounting holes in the support surface or requiring the mount 100 to be mounted between wall studs.

Arm assemblies 106 can be pivotally connected to slide plate 120 of back assembly 104. In one embodiment, arm assemblies can be pivotally connected by inserting a sleeve 109 of each arm assembly over a connector rod 124 affixed to slide plate 120 with brackets 125. Each arm assembly 106 includes a first arm 126 pivotally connected to a second arm 128. Second arms 128 are pivotally connected to mount assembly 102 with arm mount 136.

Figure 21:
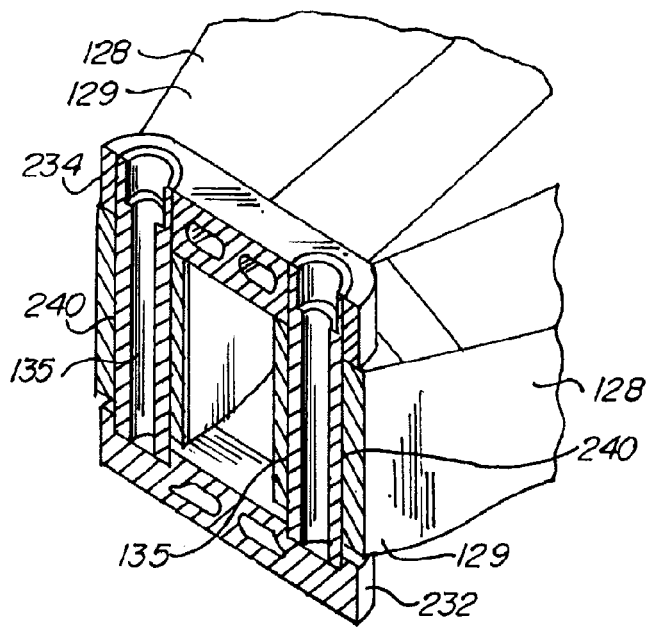
FIG. 21 is a cross-sectional view taken at section 21-21 of FIG. 14.
Figure 23:
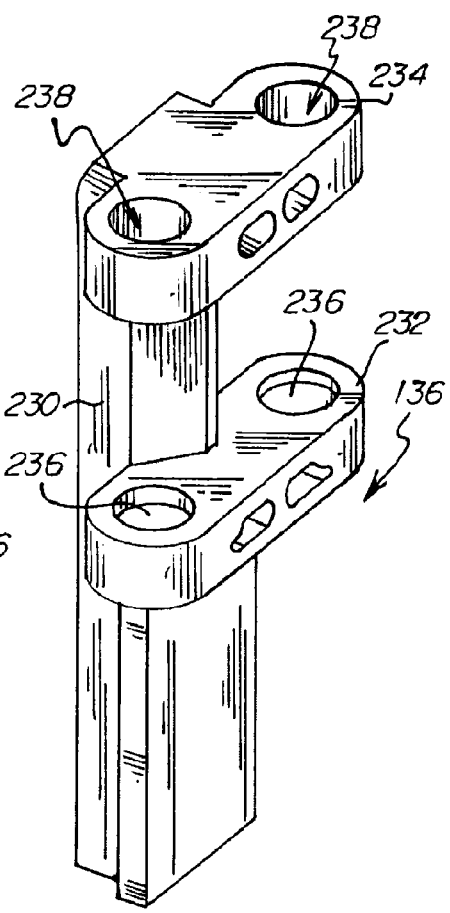
FIG. 23 is a perspective view of an arm mount portion of the mount of FIG. 1.

Arm mount 136 as depicted in FIG. 23 generally includes column 230, lower flange 232, and upper flange 234. Lower flange 232 defines recesses 236, while upper flange 234 defines apertures 238. As depicted in FIG. 21, arms 128 are pivotally coupled to arm mount 136. End portion 129 of arm 128 defines bore 240 therethrough. Pivot pins 135 are received through apertures 238 and bore 240 and rest in recesses 236. A safety feature of this configuration is that pivot pins 135 are retained in place by gravity and arm mount 136 cannot be disconnected from arms 128 unless pivot pins 135 are drawn upward through apertures 238.

As can be seen in FIGS. 4-7, arms 126, 128 can be substantially hollow, with arm 126 defining wire channel 216 and arm 128 defining wire channel 218. This enable wires that are to be connected to a display on display mount 100 to be contained substantially within arms 126, 128. Arms 126, 128 can include a plurality of removable covers 130 that allow access to the wire channels 216, 218, in arms 126, 128 for inserting and removing wires. Wire apertures 129 can be defined in a bottom surface 127 of arms 126, 128 through which wires can extend for connection with the display, wall outlet, or other device. Positioning wires within arms 126, 128 enables wires to be substantially hidden from view, which creates a more aesthetically pleasing appearance. Such positioning also reduces the likelihood and extent to which wires may become tangled with each other.

Figure 22:
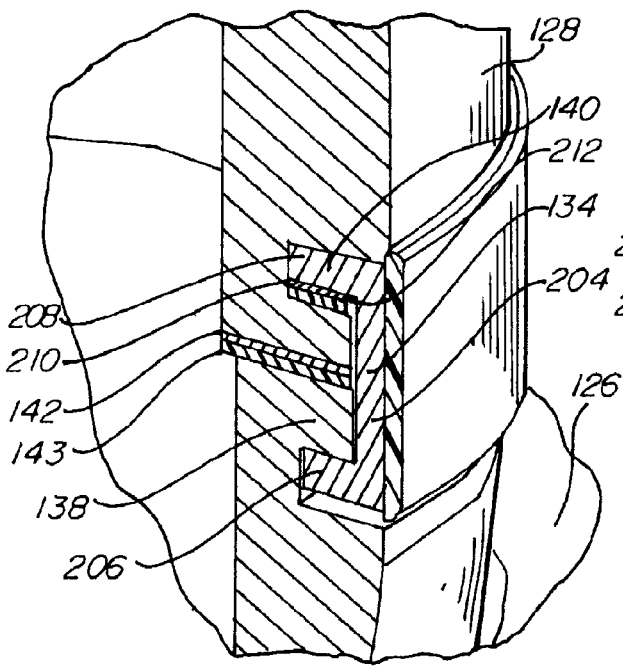
FIG. 22 is a cross-sectional view taken at section 22-22 of FIG. 8.

Referring to FIGS. 8-11a and 22, first arm 126 and second arm 128 are pivotally connected to one another. A flange portion 138 of first arm 126 can abut against a flange portion 140 of second arm 128 with metal friction washer 142 and polymer friction washer 143 disposed therebetween. The position of metal washer 142 and polymer washer 143 may be reversed in some embodiments. First arm 126 defines circumferential recess 200 while second arm 128 defines circumferential recess 202. A pair of c-clamps 134 can hold flange portions 138, 140 together. Each c-clamp 134 generally includes web portion 204 with projecting upper 206 and lower 208 legs. Lower leg 208 is received in recess 200 while upper leg 206 is received in recess 202. Split ring washers 210, 212, are received in recess 202 below upper leg 206 as depicted in FIG. 22. Again split ring washers 210, 212, may be made from metal and polymer materials respectively, and may be reversed in position in some embodiments. A band 132 surrounds c-clamps 134 to retain them in position. The washers in each pair 142, 143, and 210, 212, are advantageously made from diverse materials (e.g. metal and polymer) in that this has been found to enable smooth pivoting of arms 126, 128, without undue friction, sticking, and component wear.

Figure 8:
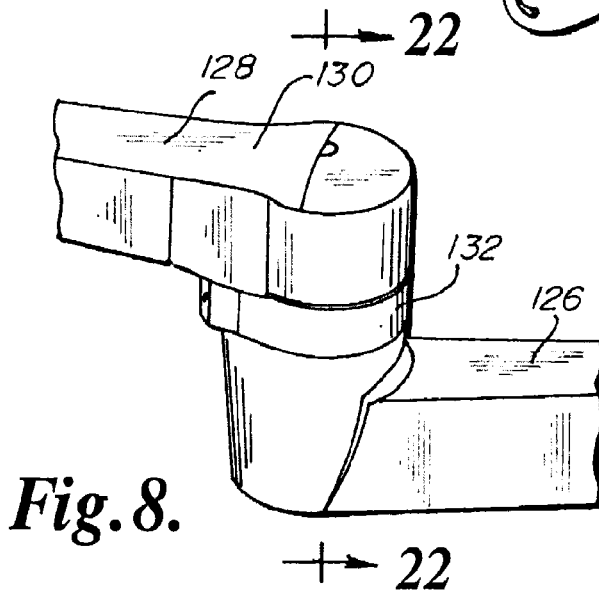
FIG. 8 is a perspective view of a portion of the flat panel display mount of FIG. 1.
Figure 8A:
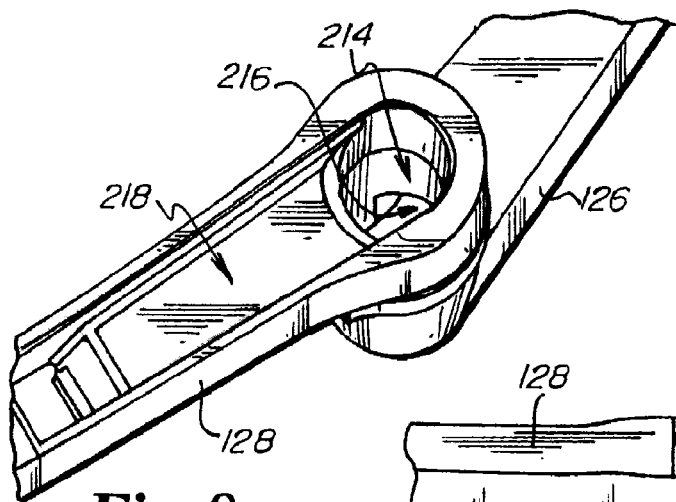
FIG. 8*a* is a perspective view of the pivotal connection between the arms of the display mount of FIG. 1 with wire covers removed.
Figure 9:
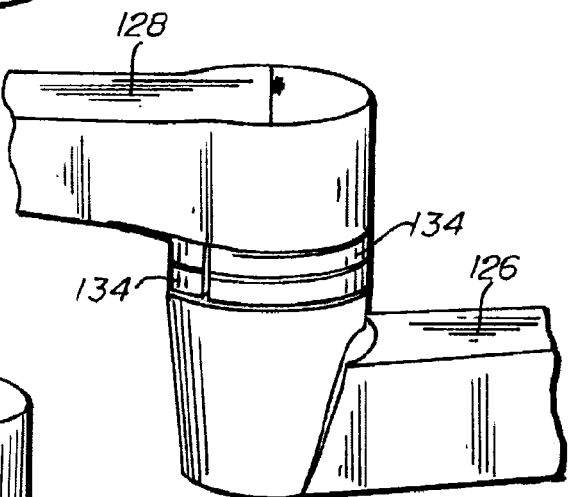
FIG. 9 is a perspective view of a portion of the flat panel display mount of FIG. 1.
Figure 10:
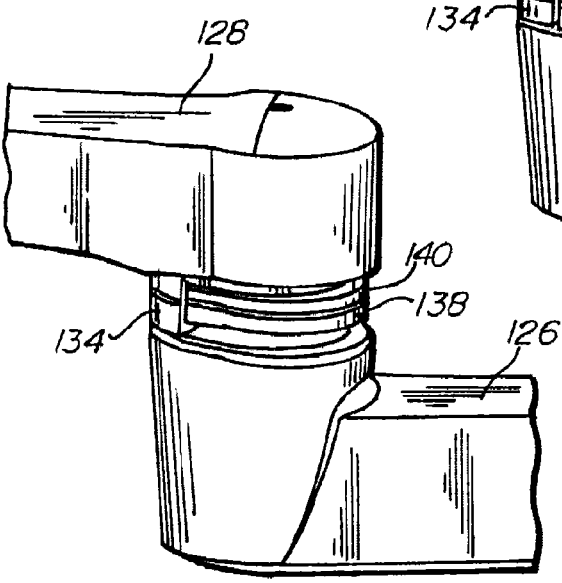
FIG. 10 is a perspective view of a portion of the flat panel display mount of FIG. 1.
Figure 11:
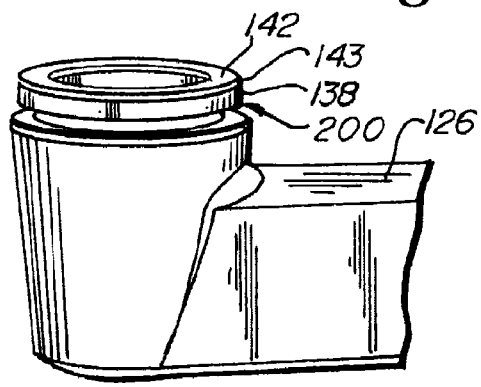
FIG. 11 is a perspective view of a portion of the flat panel display mount of FIG. 1.
Figure 11A:
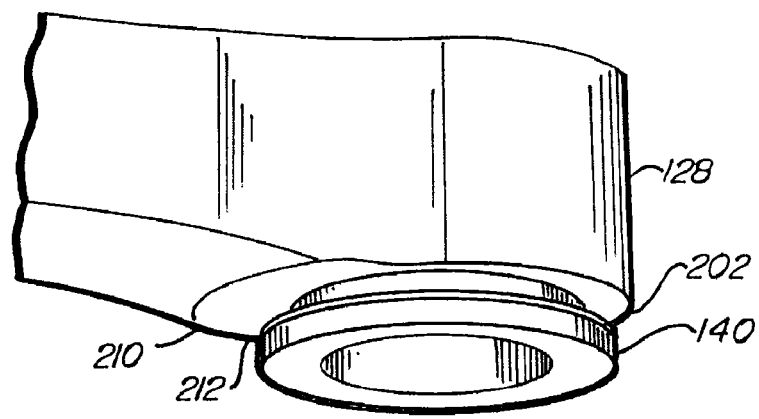
FIG. 11*a* is a perspective view of the end of an upper arm of the mount of FIG. 1.

As depicted in FIG. 8a, the pivoting connection between arms 126, 128, is advantageous in that the arms together define central bore 214 connecting wire channel 216 in arm 126 with wire channel 218 in arm 128. Central bore 214 is preferably sized to enable passage therethrough of the largest wire connector that will be connected to a display mounted on display mount 100.

As can be seen in FIGS. 1-3, mounting assembly 102 generally includes a pair of brace arms 154 connected to a pair of side brackets 150 and threaded through a center bracket 152. A tilt head 158 is connected to a rear surface 160 of center bracket 152.

Figure 12:
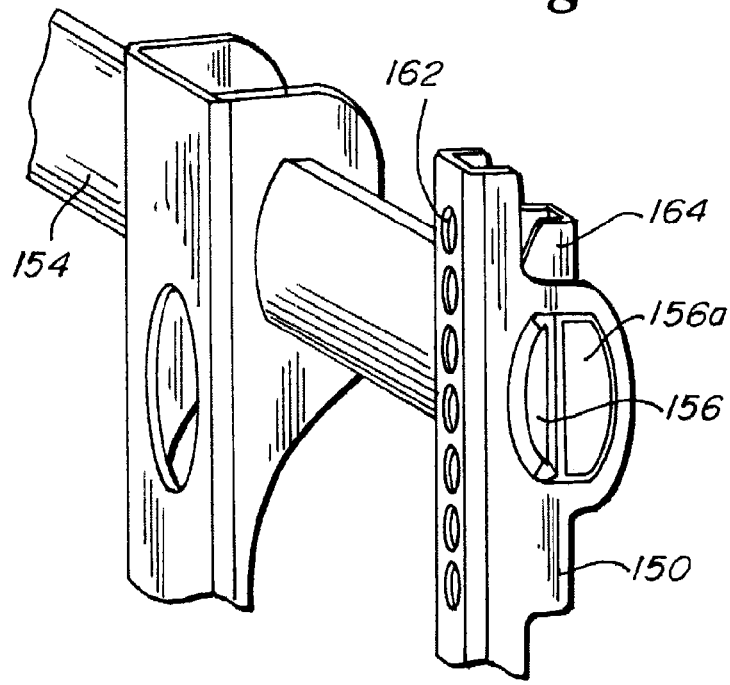
FIG. 12 is a perspective view of a portion of the flat panel display mount of FIG. 1.
Figure 13:
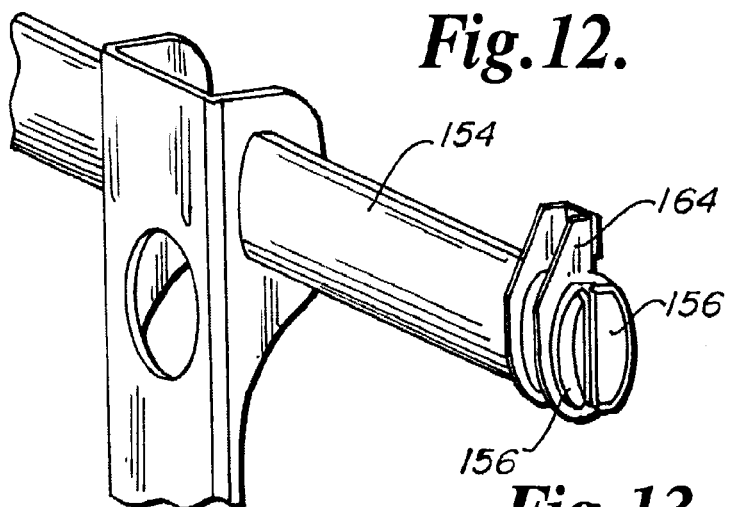
FIG. 13 is a perspective view of a portion of the flat panel display mount of FIG. 1.
Figures 12A, 14:
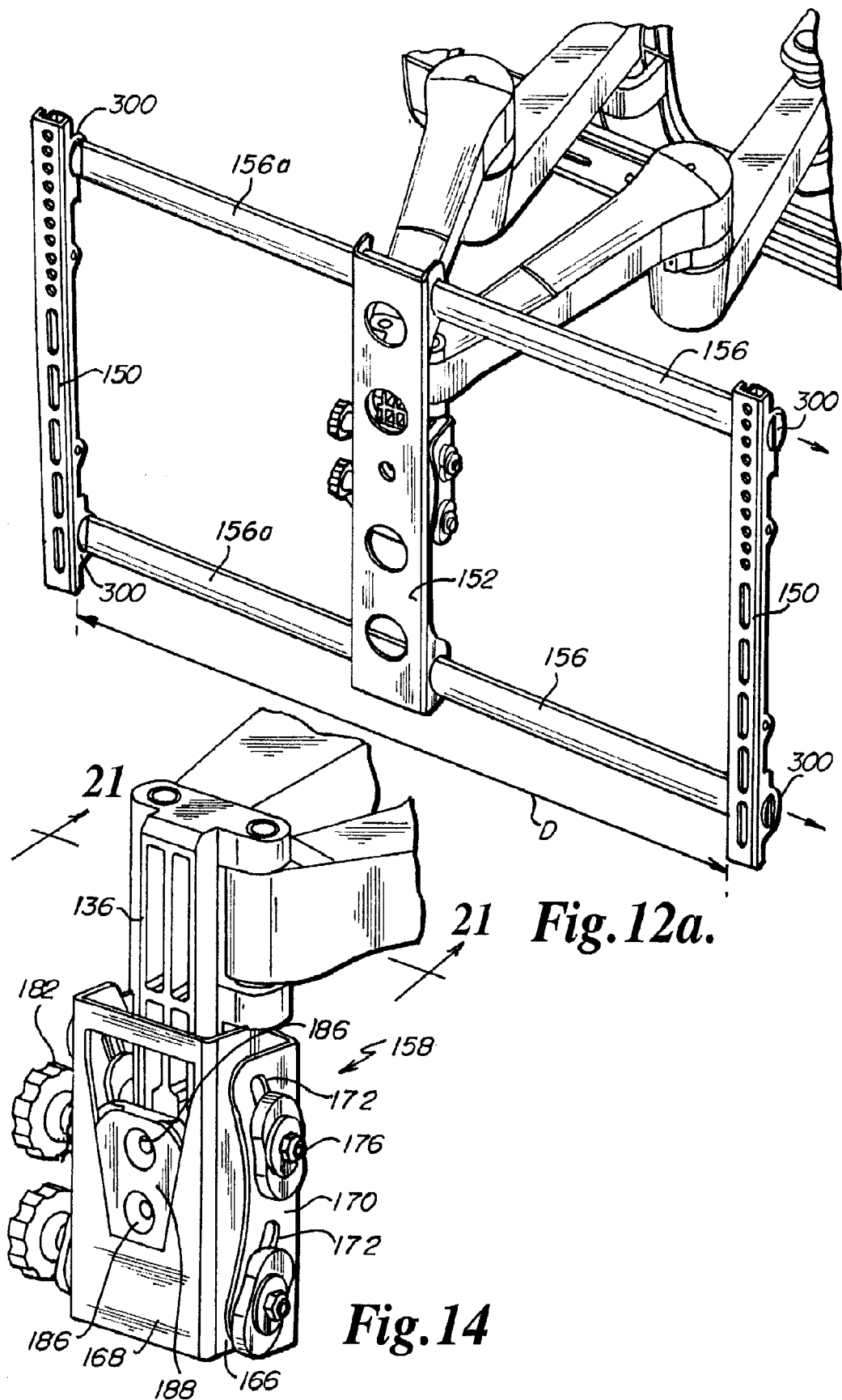
FIG. 12*a* is a perspective view of a mount according to an embodiment of the invention with the brace arms extended to accommodate a large flat panel display.
FIG. 14 is a perspective view of a portion of the flat panel display mount of FIG. 1.

Side brackets 150 each include a plurality of slots 162 for mounting a display onto mount assembly 102. As shown in FIG. 12 and FIG. 13, each of brace arms 154 generally includes a pair of generally d-shaped tubes 156, 156a, that are slidably disposed against each other. Tubes 156, 156a, are held within side brackets 150 by bracket 164. As depicted in FIG. 12a, sliding tubes 156, 156a, relative to each other enables the distance D between side brackets 150 to be adjusted to fit the mounting apertures of variously sized flat panel displays. Bracket 164 can comprise a resilient material so that as tubes 156, 156a, are slid away from each other, a bracket 164 tightens around the tube remaining in the upper and lower portion of each side bracket 150, retaining it therein. Brace arms 154 comprised of d-shaped tubes 156, 156a, slidable relative to each other enables mount assembly 102 to be adjustable to fit a broad range of flat panel displays of different sizes and differently located mounting holes. The overall length of tubes 156, 156a, between side brackets 150 can be adjusted so that no part of either the upper or lower brace arms 154 extends beyond the width of the display, creating a more aesthetically pleasing appearance. In addition, each of side brackets 150 may be positioned anywhere along the length of brace arms 154 between center bracket 152 and brace arm ends 300, thereby providing even more mounting flexibility.

FIGS. 14-17 depict one embodiment of a tilt head 158 of one embodiment of the display mount 100 of the present invention. Tilt head 158 allows flat panel display 101 and mount assembly 102 to be tilted upward or downward relative to arm assemblies 106 and back assembly 104. Tilt head 158 can include a first casing 166 having a front surface 168 that can be affixed to the center bracket 152 of mount assembly 102 by inserting fasteners through apertures 184 in center bracket 152 and through apertures 186 in a connector 188 in tilt head 158. A second casing 170 can be affixed to first casing 166 through complementary curved slots 172, 174. Slots 172 can be connected to one another by threading a screw 176 through a guide member 178 and a washer 180 that can be tightened together with a nut 182. Guide member 178 passes through slot 172 and has geometry conforming to the curvature of slot 172 so that they can be rotated relative to each other. Slots 174 are also connected by threading a screw 176 through a guide member 178 and washer 180. Guide members 178 in slots 174 are each connected to a rotatable dial 182. Rotatable dial 182 allows guide member 178 to articulate within slot 174 thereby causing tilt head 158 to tilt the mount assembly 102 and display 101 as the guide members 178 travel along the curved interiors of slots 172, 174.

Slots 172, 174, can have a generally constant radius of curvature with a center coincident with a substantially horizontal axis. Rotation of guide members 178 through slots 172, 174 rotates flat panel display 101 about axis, defining a path of travel for the revolving movement. Tilt head 158 and panel mount 102 can be positioned such that the horizontal axis extends through or proximate the center of gravity of mount assembly and a flat panel display 101 mounted thereon. Therefore, as flat panel display 101 is revolved through the path of travel defined by slots 172, 174, the center of gravity remains substantially stationary. Such systems are disclosed in U.S. Pat. Nos. 6,905,101 and 7,152,836, which are hereby incorporated by reference in their entirety.

Because the horizontal axis substantially coincides with the center of gravity, flat panel display 101 and mount assembly 102 are substantially vertically balanced. As a result, substantially the same effort is required to revolve flat panel display 101 in the upward direction as in the downward direction. This makes the display mount 100 self-balanced and easy to rotate, but still may be positioned at a plurality of locations without the need for additional locking structure. This is advantageous for use with large flat panel displays, which can be heavy and difficult to maneuver.

Figure 18:
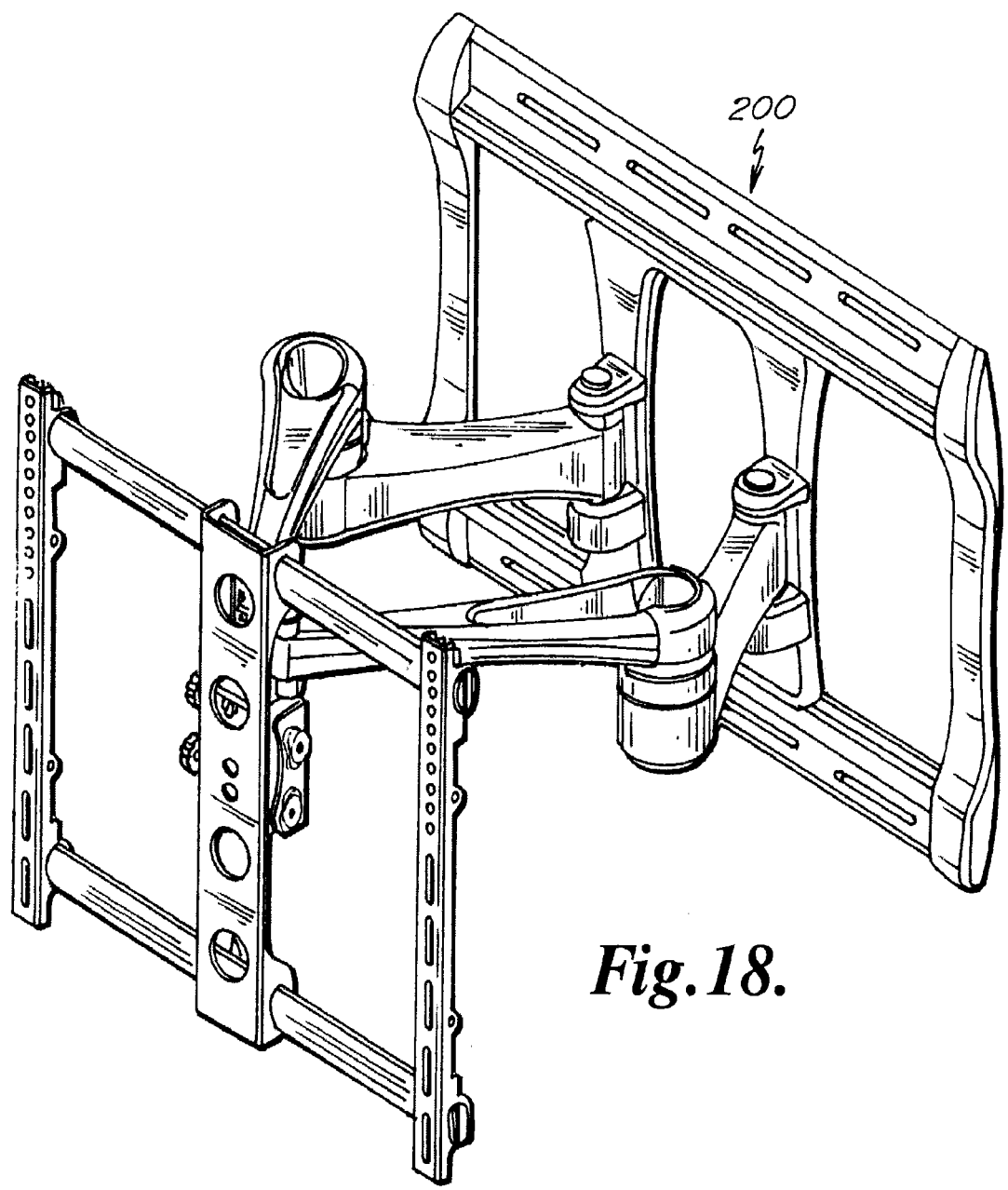
FIG. 18 is a front perspective view of a flat panel display mount according to an embodiment of the present invention.
Figure 19:
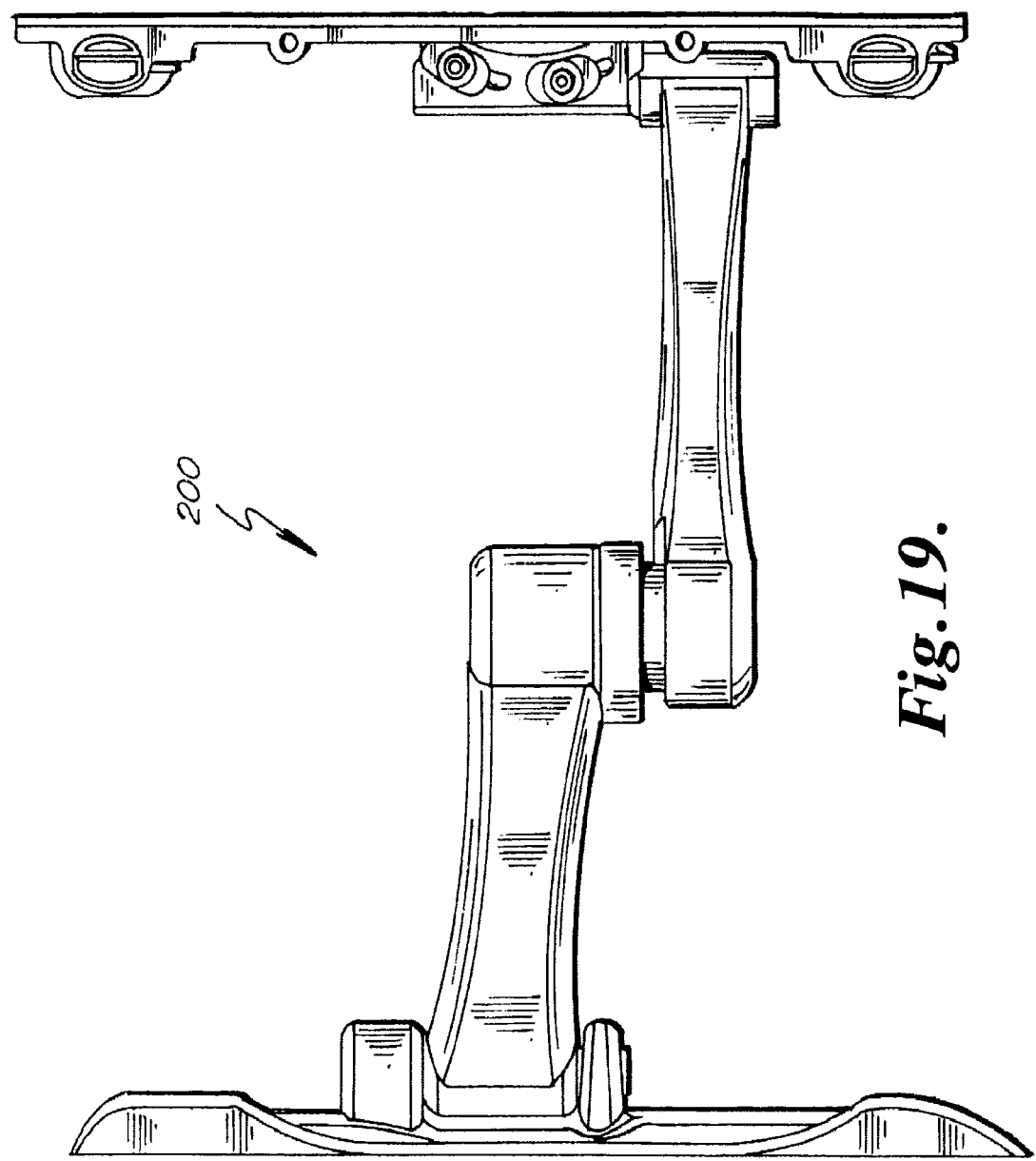
FIG. 19 is a side view of the flat panel display mount of FIG. 18.
Figure 20:
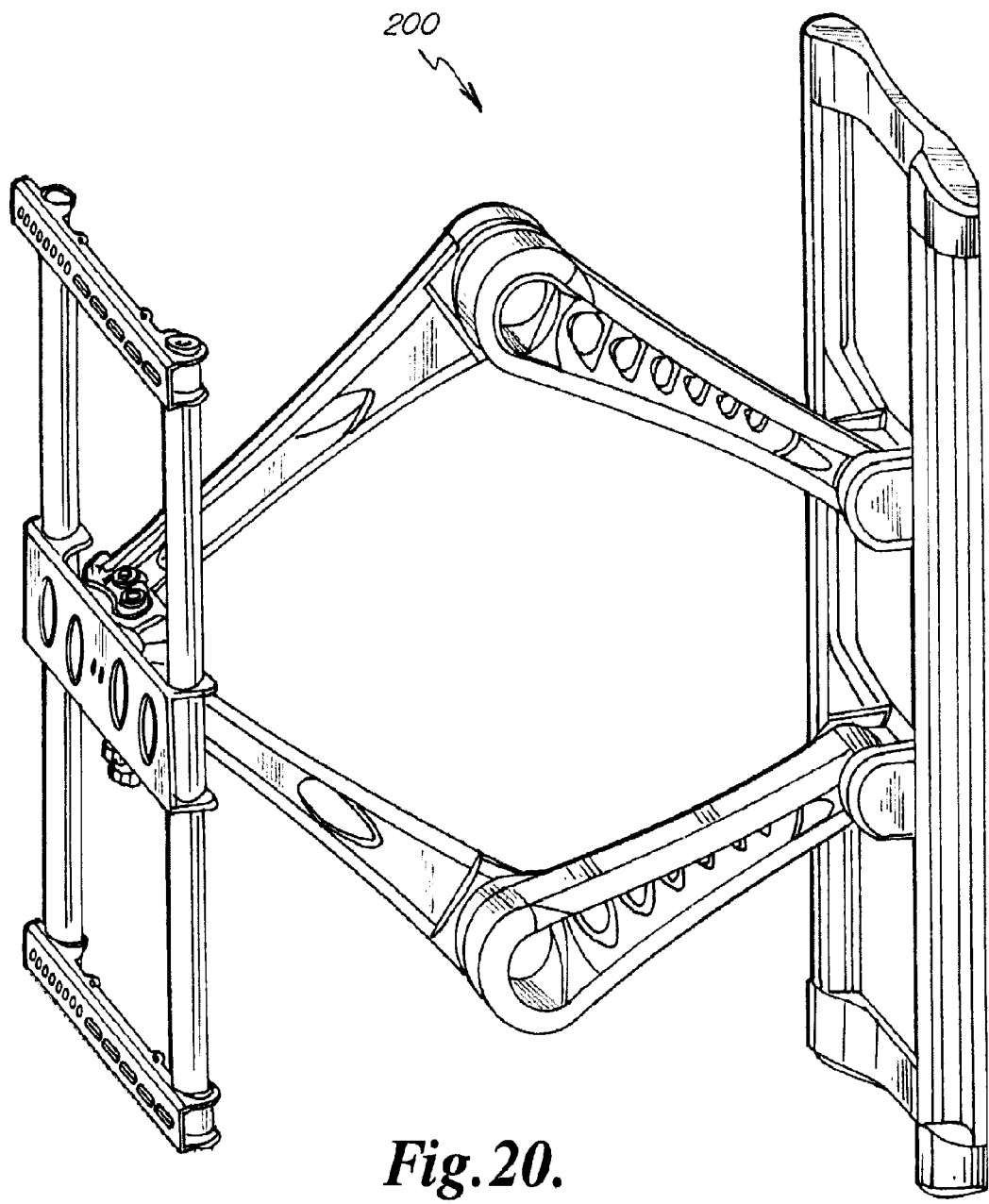
FIG. 20 is a perspective view of the flat panel display mount of FIG. 18.

FIGS. 18-20 depict another embodiment of a display mount 200 of the present invention. The description of the functions and components of display mount 100 are applicable to display mount 200.

Figures 24, 25A, 25B:
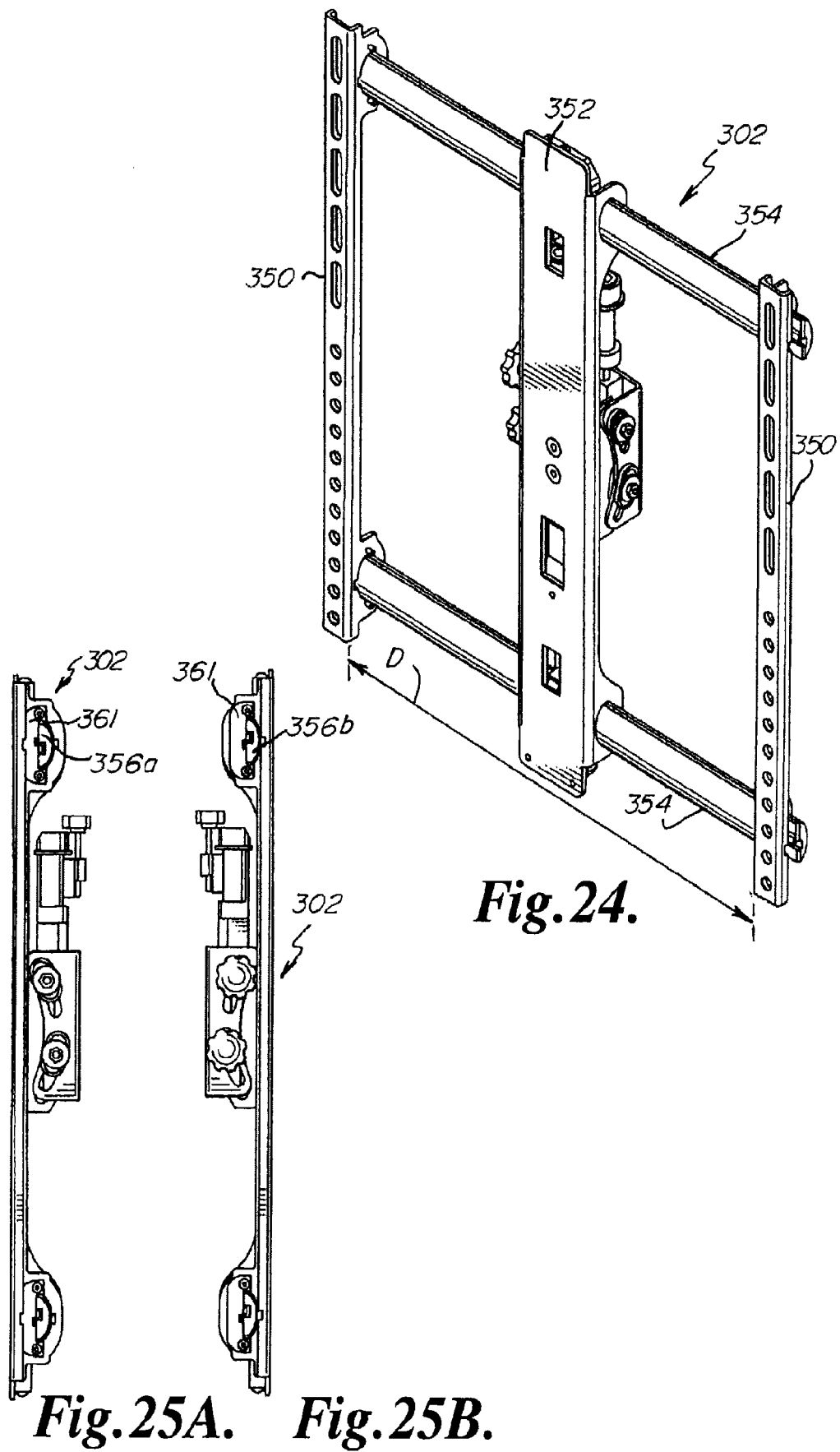
FIG. 24 is a perspective view of a mounting assembly for a flat panel display mount according to an embodiment of the present invention.
FIG. 25A is a side view of the mounting assembly of FIG. 24.
FIG. 25B is a side view of the mounting assembly of FIG. 24
Figure 26:
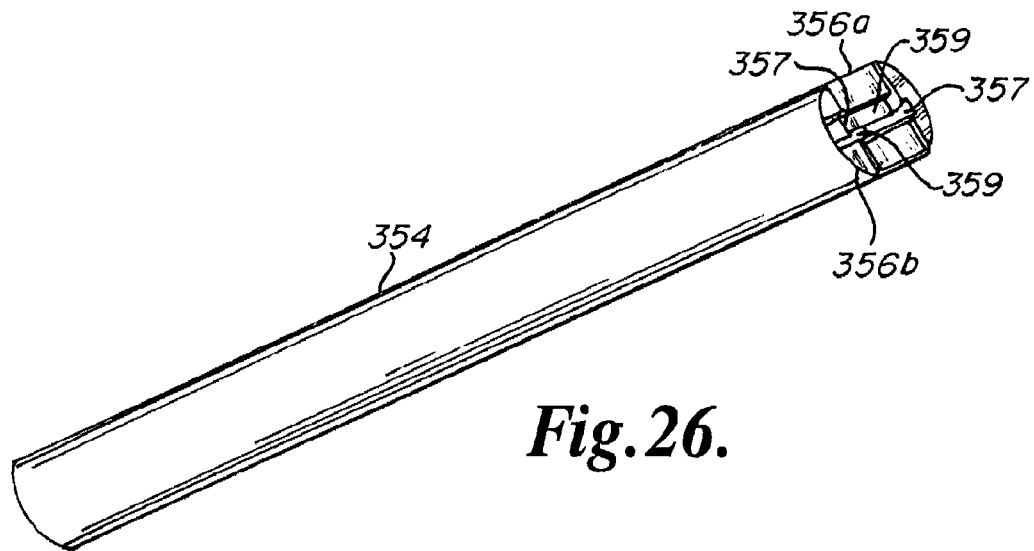
FIG. 26 is a perspective view of a portion of the mounting assembly of FIG. 24.

Referring to FIGS. 24-26, there can be seen another embodiment of a mounting assembly 302 that can be used with a display mount 100 of the present invention. Mounting assembly 302 generally includes a pair of brace arms 354 connected to a pair of side brackets 350 and threaded through a center bracket 152. As shown in FIG. 26, brace arms 354 generally include a pair of members 356a, 356b. Members 356a, 356b are slidably connected to each other via complementary slots 357 and projections 359. Sliding tubes 356a, 356b relative to each other allows the distance D between side brackets 350 to be adjusted to fit variously sized flat panel displays. Brackets 361 can be connected to side brackets 350 and members 356a, 356b to retain brace arms 354 within side brackets 350. One bracket 361 can retain one of the members 356a within one side bracket 350 and a second bracket 361 can retain the other member 356b within the other side bracket 350. This configuration allows the overall length of brace arms 354 to be adjusted with no part of the tubes 356a, 356b extending beyond the width of a mounted display.

Figure 27:
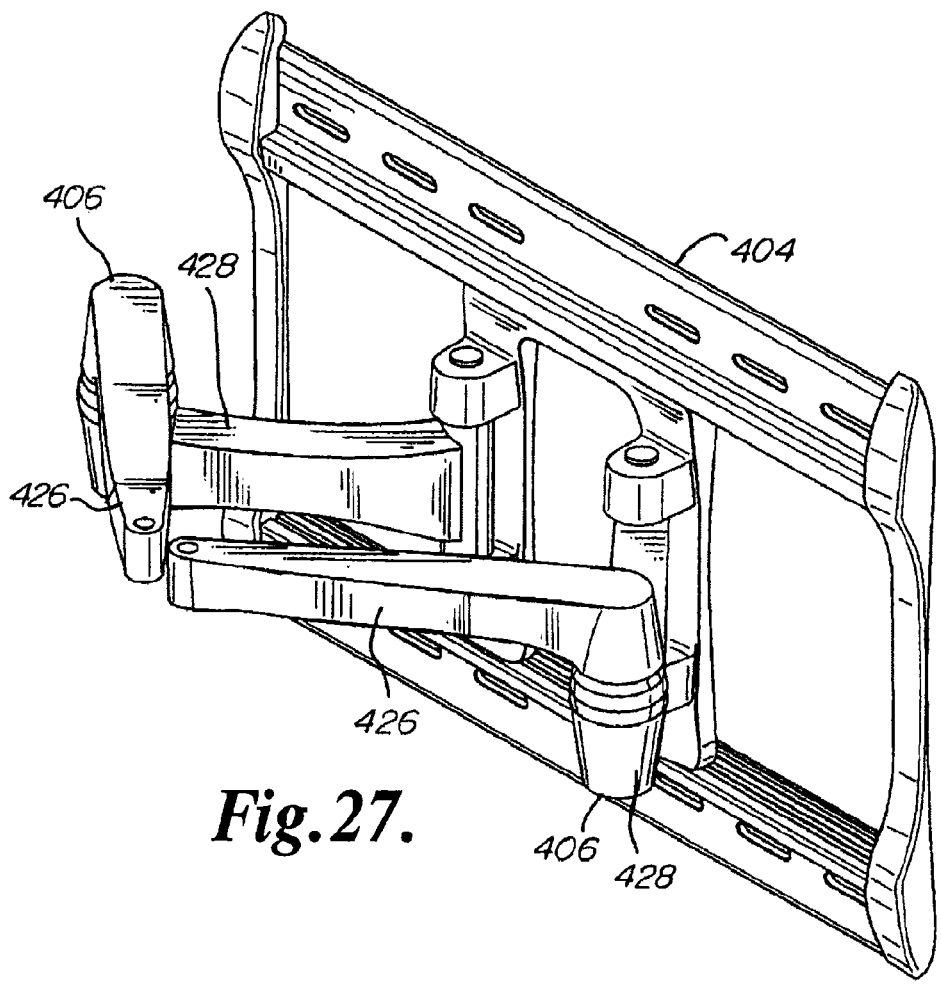
FIG. 27 is a perspective view of a back assembly and arm assemblies for a flat panel display mount according to an embodiment of the present invention.
Figure 28:
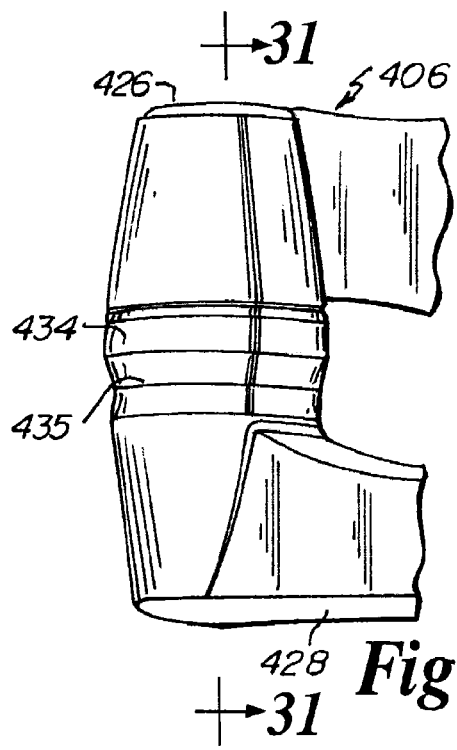
FIG. 28 is a perspective view of a portion of one of the arm assemblies of FIG. 27.
Figure 29:
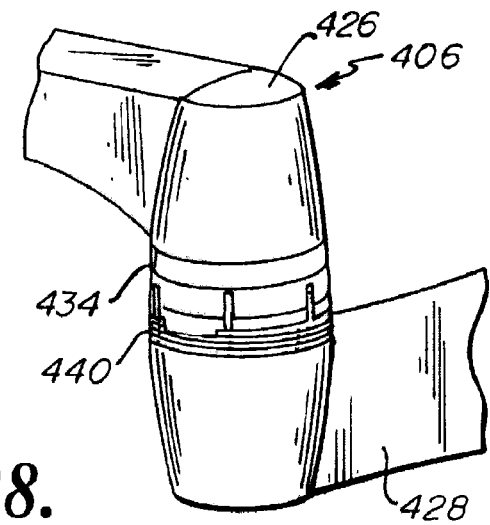
FIG. 29 is a perspective view of a portion of one of the arm assemblies of FIG. 27.
Figure 30:
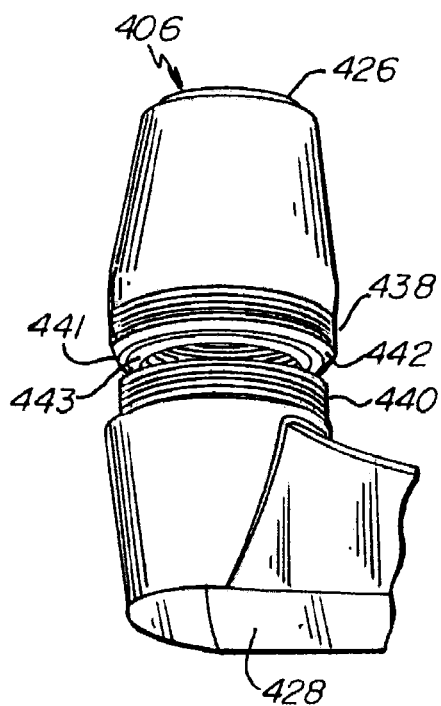
FIG. 30 is a perspective view of a portion of one of the arm assemblies of FIG. 27.
Figure 31:
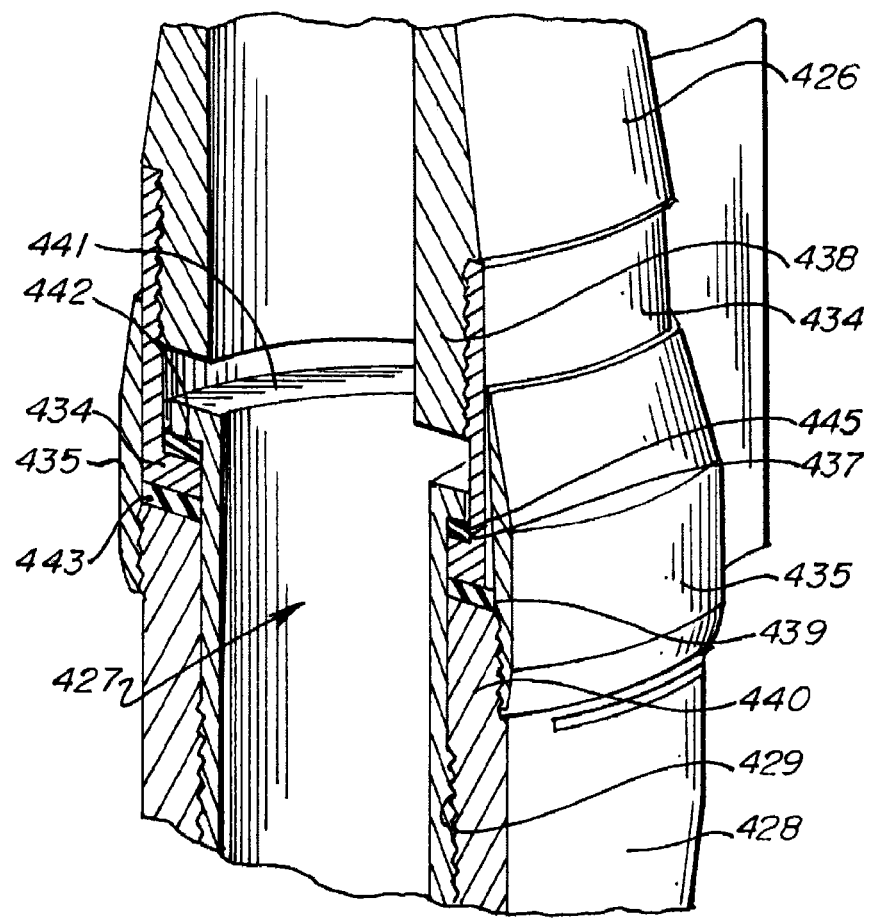
FIG. 31 is a cross-sectional view taken at section 31-31 of FIG. 28.

Referring to FIGS. 27-29 there can be seen another embodiment of a back assembly 404 and a pair of arm assemblies 406 that can be used with a display mount of the present invention. Back assembly 404 is configured substantially similarly to back assembly 104 described above. Arm assemblies 406 each include a pair of arms 426, 428. Arms 426, 428 can be substantially hollow in order to contain wires that are connected to a display mounted on a display mount. Positioning wires within arms 426, 428 enables wires to be substantially hidden from view, which creates a more aesthetically pleasing appearance, and reduces the likelihood and extent to which wires may become tangled with each other.

As can be seen in FIGS. 28-31, arms 426, 428 are pivotally connected to each other. A flange portion 438 of first arm 426 and a flange portion 440 of second arm 428 can be held together with a first circular clamp 434 and a second circular clamp 435 with a metal friction washer 442, a polymer washer 443, and a flange member 441 in between. Polymer washer 443 can rest atop an upper surface 439 of flange portion 440 of second arm. First circular clamp 434 can surround flange portion 438 of first arm 426 and can rest atop polymer washer 443. Metal friction washer 442 can rest atop a ledge 437 of first circular clamp 434. Flange member 441 can extend along an inner surface 429 of second arm 428 and can have a lip 445 that rests upon metal friction washer 442. Second circular clamp 435 can surround flange portion 440 of second arm 428 and a portion of first circular clamp 434. Flange portions 438, 440, flange member 441, first circular clamp 434 and/or second circular clamp 435 can be threaded. Arms 426, 428 define a central bore 427 connecting the hollow interior wire channels of each arm 426, 428 to allow electrical cords to extend completely through both arms 426, 428. Arms 426, 428 can also include wire apertures for extending cords into and out of arms 426, 428.

While the present invention has been shown and described in detail, the invention is not to be considered as limited to the exact forms disclosed, and changes in detail and construction may be made therein within the scope of the invention without departing from the spirit thereof.

The invention claimed is:

1. A mounting device for a flat panel display, comprising:
a back assembly including apertures for affixing the back assembly to a support surface;
a mounting assembly, the mounting assembly comprising:
a pair of generally horizontal brace arms connected to a pair of generally vertical side brackets, the side brackets including apertures for affixing a flat panel display thereto, the brace arms each including a pair of members, wherein one member of each pair of members is fixedly coupled to the other side bracket, and the other member of the pair of members is fixedly coupled to the other side bracket of the pair generally vertical side brackets, wherein each pair of members is slidably disposed against each other such that sliding the members relative to each other causes the distance between the side brackets to change; and
at least one arm assembly connecting the back assembly to the mounting assembly.

2. The device of claim 1, wherein the mounting assembly further comprises a means for retaining each member within an aperture in one of the side brackets.

3. The device of claim 1, wherein the members are slidably disposed with each other via a complementary groove and projection on each member.

4. The device of claim 1, wherein the members are generally d-shaped.

5. The device of claim 1, further comprising a center bracket through which the brace arms are threaded.

6. The device of claim 5, further comprising a tilt head configured to allow the mounting assembly to be tilted relative to the back assembly and arm assembly connected to the center bracket.

7. The device of claim 1, wherein the at least one arm assembly includes a first arm and a second arm pivotally connected to each other, and wherein each arm defines a substantially hollow wire channel and the arms define a hollow central bore connecting the wire channel of the first arm with the wire channel of the second arm.

8. The device of claim 1, wherein the back assembly comprises:
a generally rectangular support from having a top rail, a bottom rail, a first side rail, and second side rail; and
a slide plate connected to the at least one arm assembly, wherein the slide plate is slidably disposed in a track extending along an interior of the top rail and the bottom rail such that the arm assembly can be moved laterally relative to the back assembly without moving the generally rectangular support.

9. The device of claim 1, wherein the apertures for affixing the back assembly to a support surface are elongated.

* * * * *